March 12, 1957  A. E. THURBER, JR  2,784,738
VALVES FOR CONTROLLING THE OPERATION OF HYDRAULIC ELEVATORS
Filed Jan. 15, 1952  6 Sheets-Sheet 1

INVENTOR.
ADOLPH E. THURBER, JR.
BY
ATTORNEY.

March 12, 1957  A. E. THURBER, JR  2,784,738
VALVES FOR CONTROLLING THE OPERATION OF HYDRAULIC ELEVATORS
Filed Jan. 15, 1952  6 Sheets-Sheet 2

INVENTOR.
ADOLPH E. THURBER, JR.
BY
ATTORNEY.

INVENTOR.
ADOLPH E. THURBER, JR.
BY
ATTORNEY.

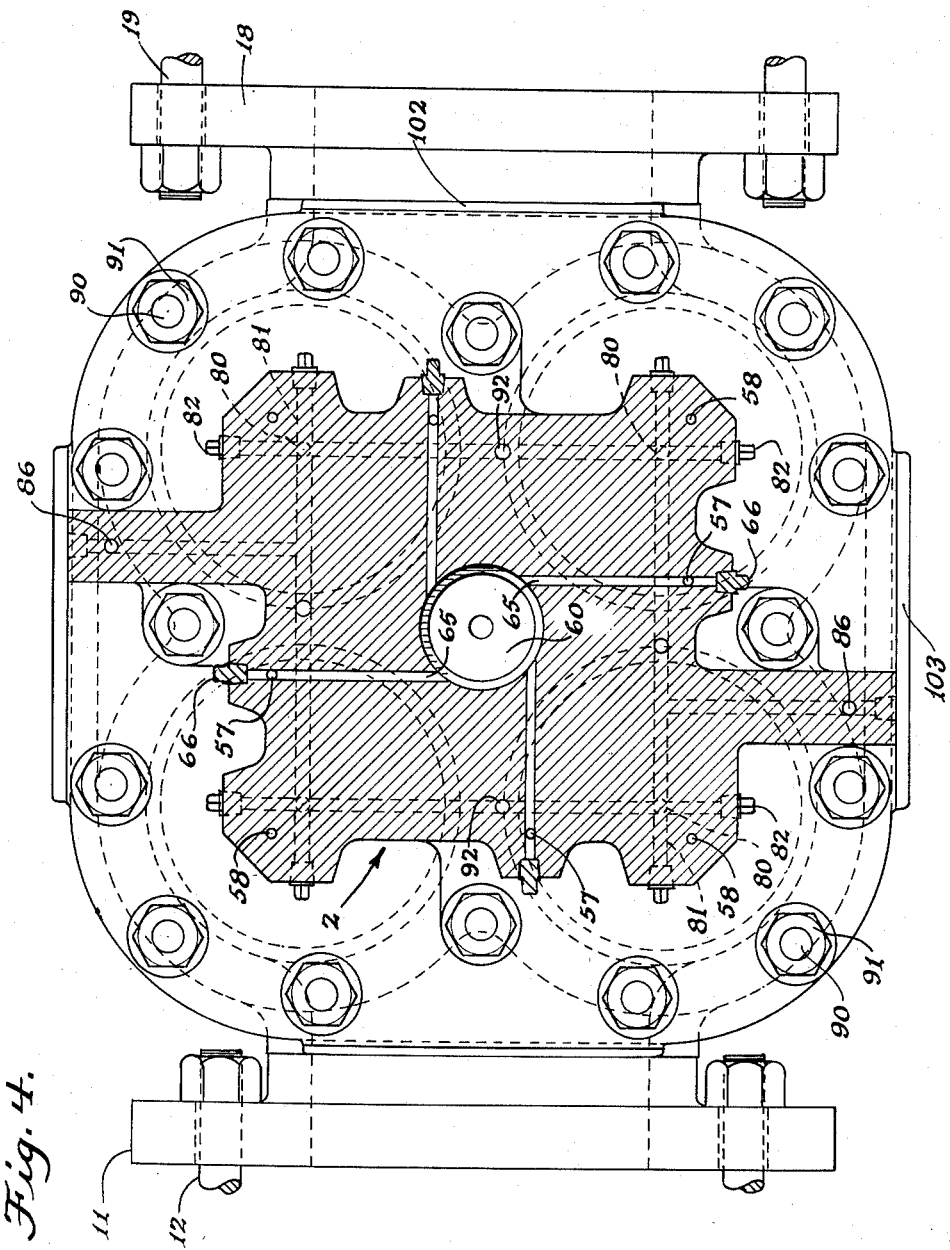

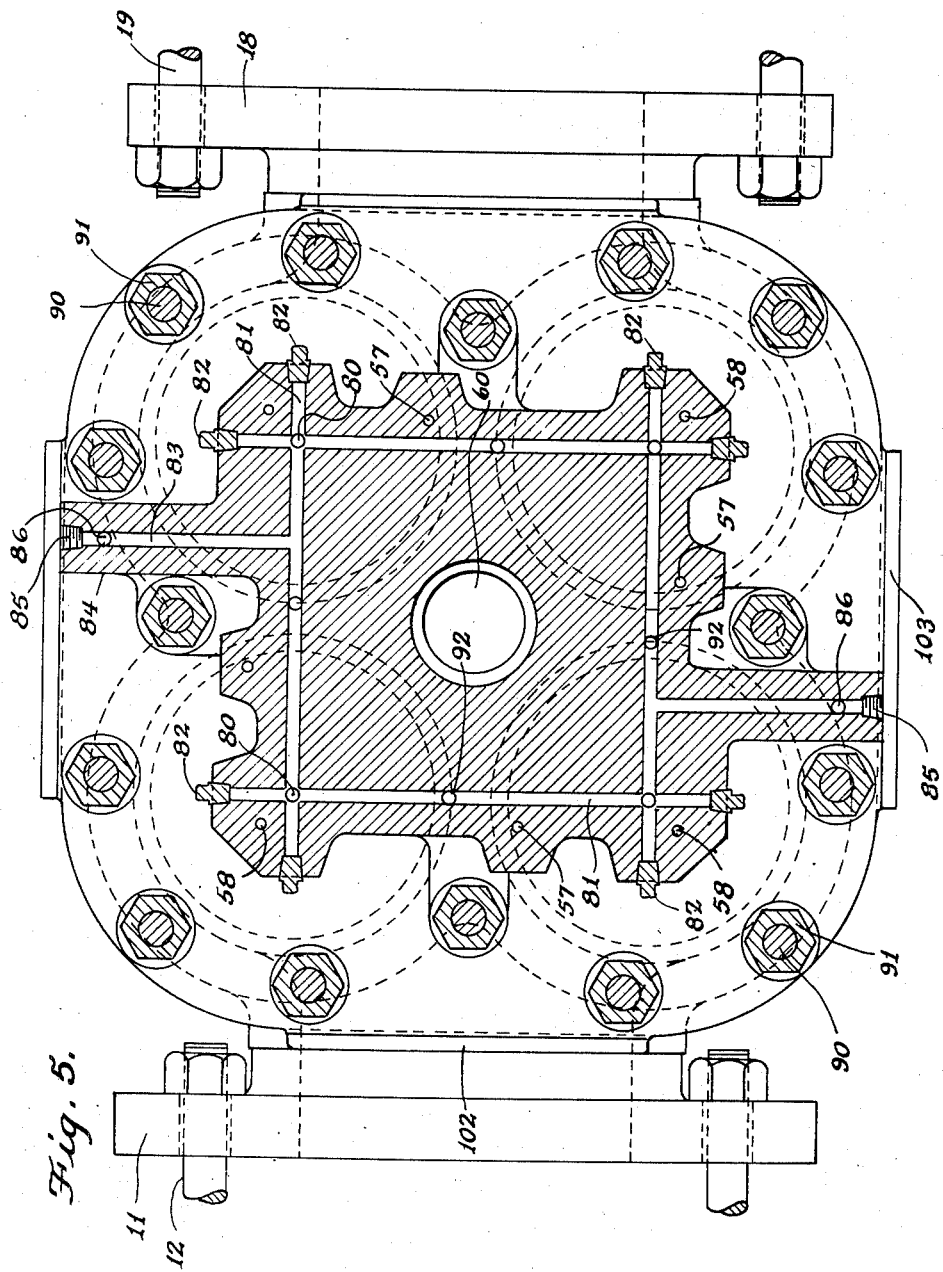

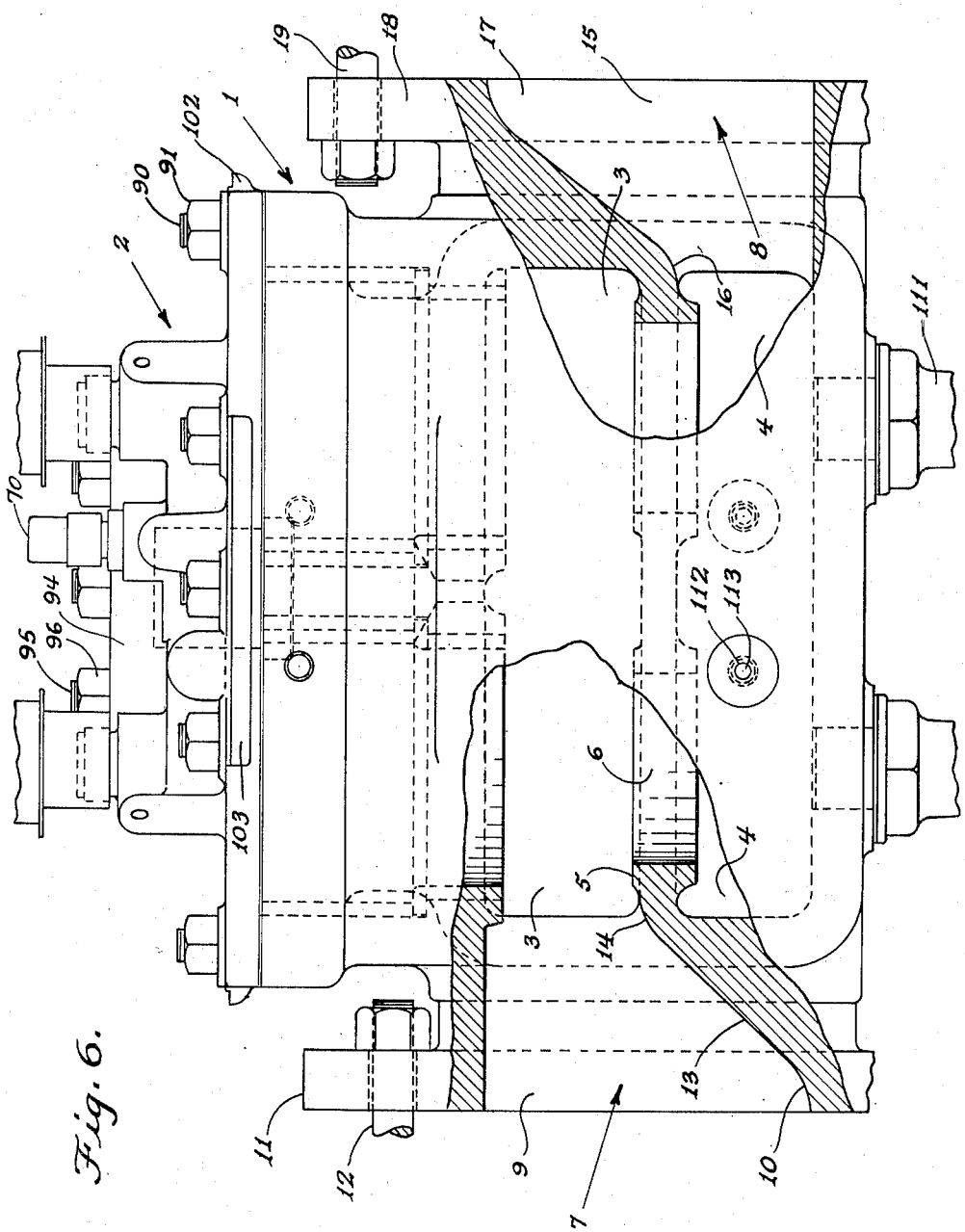

United States Patent Office 2,784,738
Patented Mar. 12, 1957

2,784,738

VALVES FOR CONTROLLING THE OPERATION OF HYDRAULIC ELEVATORS

Adolph E. Thurber, Jr., Brooklyn, N. Y.

Application January 15, 1952, Serial No. 266,565

10 Claims. (Cl. 137—599)

This invention relates to valves for controlling the operation of hydraulic elevators and is more particularly concerned with unitary assemblies of such devices.

The mechanisms heretofore employed for control of the operation of hydraulic elevators have been subject to a number of drawbacks. For one thing, in and of themselves, they have been difficult to adjust or vary in the course of their initial installation to obtain particular desired operation. They have been more difficult to adjust or repair during the course of their use. The makeup of the mechanisms themselves has been partly responsible for this, while another part has been due to the necessity for removing and replacing numerous sections of exterior piping used in conjunction with the mechanisms.

The prior art constructions involved a maze of piping in the elevator shaftway. Besides making it awkward to work on the installations, this piping introduced a factor of hazard since objects falling down an elevator shaft could well damage or fracture it. This hazard is particularly present with respect to any small auxiliary piping employed in conjunction with such elements as pilot valves, needle valves, and other elements of the control system.

Among elements of the prior art control systems subject to disruption by being hit by falling bodies such parts as pilot valves and needle valves, were particularly vulnerable. Efforts to protect them against this hazard would have further complicated the piping and provisions for adjustment going far beyond reasonable limits. Thus, no real protection of that sort was attempted.

Prior mechanisms also required more or less special tailoring for the particular job, a good part of which had to be undertaken at the time of installation by skilled employees, with consequent expense.

The mechanism for the instant invention eliminates the foregoing and other drawbacks of the prior art and introduces improvements into mechanisms of this nature which go far beyond anything heretofore contemplated. In this mechanism, exposed, cumbersome piping is eliminated. The prior art hazards, above mentioned, are likewise eliminated, and the work involved in initial and subsequent adjustment of the equipment are reduced to a minimum. In addition to introducing these improvements, the invention makes provision for the inclusion of the functions heretofore performed by the piping, in parts of the invention structure which would, in any event, have to be removed for adjustment of the operating features of the mechanism. Furthermore, this provision is made in a rugged, fool-proof manner which is in no way disturbed by the removal of the structure in which it is incorporated.

A wide range of adjustment is achieved through the invention mechanism by the assembly of a plurality of valves and control mechanisms therefor in a unitary structure. This allows for easy preselection and variation of such factors as desired speed ranges, and enables provision to be made therefor in advance so that the assembly when installed is ready to go into operation to give desired performance without involving any "on the job" tailoring. Finally, the whole assembly of the invention is fully protected in a simple straightforward manner against injury from falling objects.

Accordingly, a principal object of this invention is to consolidate valve mechanisms for controlling the operation of hydraulic elevators into a unitary assembly.

Another object is to simplify the construction of valve mechanisms for controlling the operation of hydraulic elevators.

Another important object is to eliminate substantially all of the exterior piping involved in connection with hydraulic elevator control mechanisms.

A further object is to enable easy access to the interior of hydraulic elevator control mechanisms.

A further object is to incorporate the liquid conduits of such mechanisms in the structure of the assembly in such a way that the removal of portions of the structure for gaining access to the interior of the assembly, in and of itself, causes the removal of conduits or portions thereof which might otherwise have to be disconnected.

A further object is to provide simple but effective protection for the whole assembly against injury from falling objects.

A still further object is to provide hydraulic elevator control mechanisms having simple means for the preselection of the range of speeds desired in the operation of the elevators.

More detailed objects of the invention are to provide a unitary assembly including a plurality of control valves, to provide for the ready alteration of the flow of the liquid for the control of the operation of hydraulic elevators and to provide for manual operation of the control apparatus should the normal electrical operation fail.

Other and more detailed objects of the invention will in part be obvious and in part be pointed out as the description of the embodiment of the invention illustrated in the accompanying drawing, proceeds. In that drawing:

Figure 4 is a view similar to Figure 2 but with part of the head of the assembly removed across a section taken on a horizontal plane passing through the inlet conduits for the control fluid.

Figure 1:
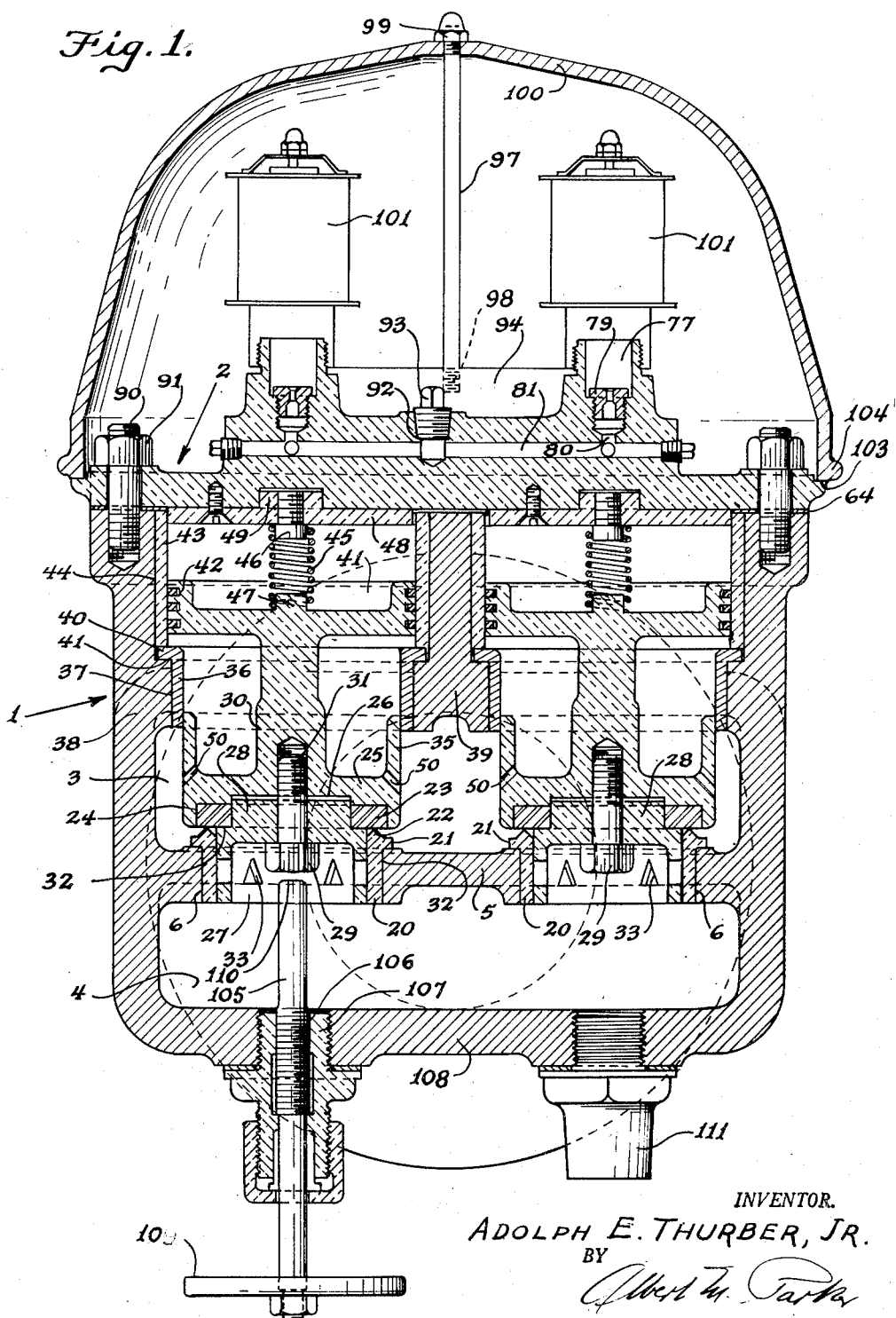
Figure 1 is a vertical section through an assembly in accordance with the invention taken through the centers of one pair of valves.

Figure 5 is a view similar to Figure 4, but with the sectional plane passing through the head at a lower level to expose the outlet conduits for the control fluid; and Figure 6 is a front elevation of the assembly with parts thereof broken away and shown in section and with the valve mechanism omitted in order to give a clear picture of the paths for passage of the operating fluid through the assembly.

Referring in detail to the illustrative embodiment shown in the accompanying drawing, the unitary assembly has a body, generally indicated at 1, and a head thereon, generally indicated at 2. The body 1 is of generally bowl shape with various dividing webs therewithin, as will appear in detail hereinafter. Preferably, the whole body would be made as a bronze casting, but where, for any reason, that cannot be done, the casting can be of some suitable metal, such as iron, with suitable bronze sleeves, or bushings, lining the iron where desired.

The lower portion of the body 1 presents a chamber through which the operating water for the elevator passes, as determined by the particular valve opening therefor. This chamber is divided into upper and lower portions 3 and 4 by means of a horizontal web 5, having openings 6 therethrough. The openings 6 are four in number and ar symmetrically spaced with the vertical center of the chamber. Each of these openings is of the same size and each is suitably bushed for the reception of a valve shield as will appear hereinafter.

The operating water for the elevator flows into the portion 3, as indicated at 7 in Figure 6, and flows out of the portion 4, as indicated at 8. A path for the flow of the water 7 is provided by a conduit 9 forming a portion of the body 1. The outer end of the conduit 9 provides a circular opening 10 with a connecting flange 11 to be suitably bolted to a mating flange of an inlet pipe by means of the bolts 12. The lower portion of the conduit 9 inclines upwardly, as indicated at 13, to form a restricted inner end 14 where the conduit opens into the upper portion 3 of the chamber. Similarly, a conduit 15 at the exhaust end is enlarged away from a restricted mouth 16 to exhaust at a circular opening 17 bordered by a flange 18 carrying securing bolts 19. The bolts 19 are here shown to be located on a circle of a greater diameter than the bolts 12, illustrating the possibility of attaching pipes of different sizes to the body. The common sized pipes that might be employed are either of 5" or 6" diameter, so provision is initially made in the flanges 11 and 18 for receiving either one of them.

Control of the passage of operating water through the chamber portions 3 and 4 is effected by valves operating in conjunction with the openings 6. In most respects, each of the valves provided for the four openings is of the same construction, so only one need be described in full detail. Differences, where they occur, are due to the fact that one of the four valves in the assembly is used for levelling and the other three are used progressively, depending on the speed desired. There is, of course, one assembly for the upward movement of the elevator and a similar assembly for the downward movement.

Each opening 6 is lined with a sleeve 20 pressed in place in the opening 6 and fitting tightly therein. Each sleeve 20 is flanged at its upper end 21 (Figures 1 and 3), to overlie part of the upper surface of the web 5 and its respective opening. Each of these flanges is provided with an upwardly extending seating portion 22, here shown as an upwardly extending annulus V-shaped in cross-section. This seat 22 engages a packing ring 23 carried in an annular recess 24 in the valve head 25. The recess 24 surrounds a deeper recess 26 coaxial therewith.

A shield in the form of a downturned cup-shaped member 27 is received within the sleeve 20 in close engagement therewith. This shield has a head 28 set in the recess 26 and secured therein by a bolt 29 which passes through the head and is threadedly received in the valve stem 30 at 31. The periphery of the head 28 is bordered by the packing ring 23 and an annular step 32 between the main part of the shield 27 and its head 28 serves to hold the packing ring 23 in position in the valve head.

The shield 27 is formed with openings 33 of the desired design and number to provide for suitable flow of water from the chamber portion 3 to the chamber portion 4 when the valve is raised, lifting the packing ring 23 off of the seat 22. As here shown, the openings 33 are of the V-shape with the apexes thereof extending upwardly. The openings 33 may, if desired, be relatively larger than as here shown, may be differently shaped and may be greater, or less in number, depending upon the volume of water to flow therethrough. Furthermore, the openings in the several shields of an assembly, particularly those of the three progressively operating valves, may differ in size or shape from one to another, depending on the total volume of water to flow and on such additional factors as desired acceleration or deceleration of the elevator.

As will appear hereinafter, the relationship of the parts of the mechanism is such that upward travel of the valve is limited so that the shields 27 do not draw all the way out of the sleeves 20, but leave a substantial portion within the same for ease of operation and elimination of flutter.

A skirt 35 extends upwardly from an around the valve head 25 to form a small piston. This piston is slidable within a sleeve 36 secured in place in an opening 37 formed in the upper part of the body 1. This opening, one of four counterparts in the assembly, is concentric with the opening 6 and is bordered by the wall 38 of the body 1, and by an inner bordering wall 39 forming part of the casting of the body 1. The sleeve 36 can, of course, be dispensed with if the body is formed entirely out of bronze, but with a body of cast iron sleeves of bronze or other non-corrosive material are needed. The sleeve 36 is flanged outwardly around its upper end at 40 to overlie a suitable annular seat 41 formed in the body of the casting.

Besides serving as a valve stem the element 30 also serves as a connecting rod between the valve head 25 and an actuating piston 41. The piston 41 is of somewhat greater diameter than the valve head 25, has piston rings 42 therearound and rides in a cylinder sleeve 43 with which it has liquid tight engagement. This sleeve is suitably secured in a bore 44 extending inward from the open mouth of the casting body 1 and between the upper surface of the casting and the reduced upper part of the wall member 39.

A spring 45 acts against the piston 41 and is located between a stud 46 at its upper end and a boss 47 in the center of the piston 41. The stud 46 is secured in the center thickened boss of a plate 48, which plate is removably secured to the undersurface of the head 2. A recess is provided in the head for the reception of that boss 49.

In order to admit water under pressure from the inlet chamber portion 3 into the space between the valve head 25 and the piston 41, one or more of several expedients may be employed. The skirt 35 may form a loose fit in the sleeve 36 so that water can pass by between them, or, as here shown, suitable openings 50 may be provided in the skirt 35. Thus, when a force is needed to raise the piston 41 and open the main valve by bringing the openings 33 up above the seat 22, water under pressure will be acting on the underside of the piston 41 for that purpose. Normally, however, the valve is kept closed through the action of water under the same pressure against the larger area on the upper side of the piston 41, plus the action of the spring 45. Pressure on the upper side of the piston 41 and release of the same when desired, for allowing the valve to open, is controlled in the following manner.

Figure 3:
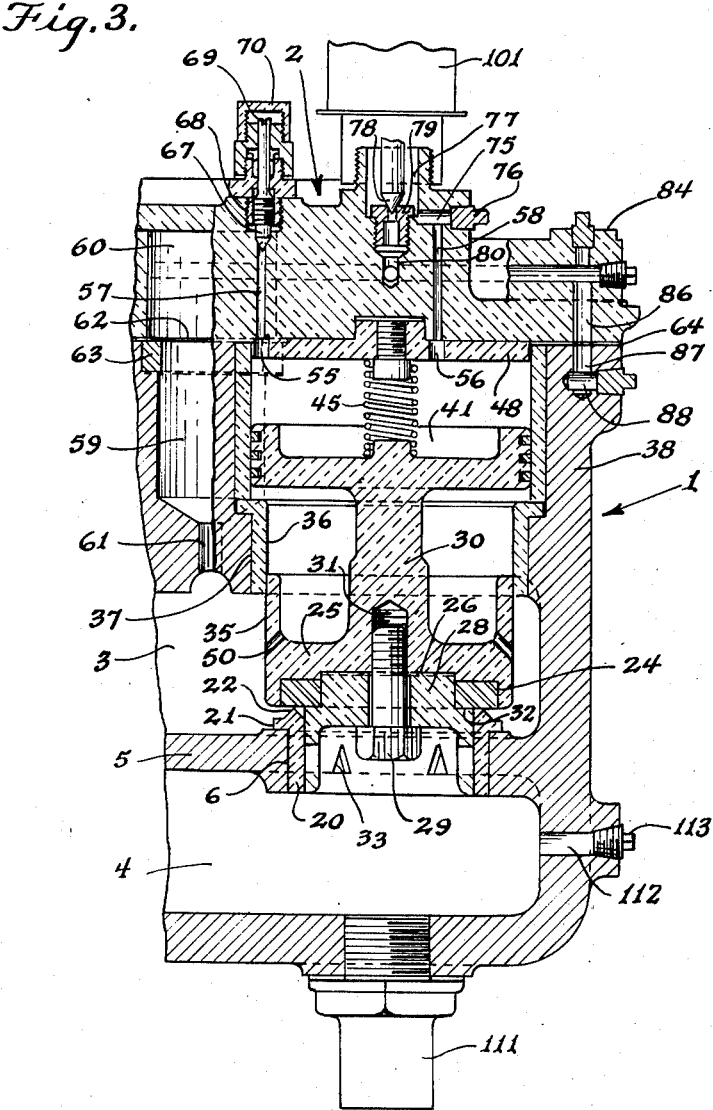
Figure 3 is a fragmentary vertical section taken on line 3—3 of Figure 2 and looking in the direction of the arrows.

Referring now to Figure 3, which is a section taken in such direction as to show all the operating features of one valve and its accompanying piston, it will be seen that there are two ports 55 and 56 through the head plate 48 in communication with bores 57 and 58 extending upwardly through the head 2. From the left hand side of this figure it will be seen that a well 59 in the body 1 communicates with an inverted receiving chamber 60 in the head 2 and communicates through a restricted opening 61 at its lower end with the chamber portion 3. Thus water under pressure from the inlet side of the assembly will fill the well 59 and the chamber 60. Leakage of water from the well and chamber is precluded by suitable packing between the head and the body as shown at 62, which packing is engaged around the well 59 by a ring 63. Suitable packing, or gasketing, material, as indicated at 64, is also provided wherever portions of the head and the body overlie each other.

Referring now to Figure 4, it will be seen that the material of the head 2 is formed with bores 65, four in number, which communicate at their inner ends with the chamber 60 and at a position outward thereof with the vertical bores 57. Thus, inlet passages are provided for water from the main to flow into the cylinder above the piston 41. Where the bores 65 emerge at the adjacent vertical wall of the head, they are closed by suitable plugs 66.

A metering needle valve 67 seated in an enlarged continuation of the bore 57 at 68 acts in conjunction with the upper end of the bore 57 where the same engages the bore 65 to control the flow of liquid into the upper end of the cylinder. This needle valve may be suitably adjusted by turning it through engaging its slotted upper end 69 with a screw driver. The structure and mounting of the needle valve are such as would be known to one skilled in the art and need not be detailed here. Accidental adjustment of the needle valve is precluded by covering the same with a suitable screw cap 70.

From the features of construction just pointed out, it will be readily apparent that water under pressure from the incoming side of the line will find its way into the head of the cylinder above the piston 41 and will act under that pressure across the whole of the piston to keep the same down and keep the main valve closed. It is to be noted here that by employing the chamber 60 and the bores 65 in communication therewith, all formed within the structure of the head itself, water flows from the inlet 6 into the cylinder above the piston without going outside of the assembly and without employing any exterior piping. The chamber 60 is right in the body of the head and the bores, or passageways, 65 all lie well within the body of the head.

A vertical exhaust bore 58 communicates at its upper end with a short horizontal bore 75. The bore 58 is here shown as of the same size as the inlet bore 57 but may well be of greater diameter to assure quick release. The bore 75 is plugged at its outer end, as indicated at 76, and conmmunicates at its inner end with a closed chamber 77. A solenoid operated needle release valve 78 extends through this chamber and serves to open and close a passage through the bushing 79 secured in the bottom of the chamber. The opening through the bushing 79 terminates at its lower end in a short vertical passage 80 communicating with a horizontal bore 81.

There are four of these horizontal bores 81, all in the same plane in the head 2 and extending across from one side to the other thereof, as best shown in Figure 5. Each bore 81 communicates with another as they cross at the openings 80. Their remote ends, where they emerge from the head, are plugged by removable screw plugs 82.

The closed figure formed by the bores 81 communicates at two positions on its opposite sides with outwardly extending outlet bores 83. These bores run out through wings 84 on the head which extend out to the outer edge of the body 1. Thus, the wings 84 overlie the side wall 38 of the body.

The ends of the bores 83 are plugged at 85 and just inward of those ends the bores 83 communicate with downwardly extending vertical bores 86. The bores 86 extend throughout the height of the head and when the head is secured in place on the main body, they align with vertical bores 87 in the side wall 38 of the body. The bores 87 as here shown terminate at their lower ends in horizontal passages 88 extending outwardly through the side wall of the body. The passages 88, either one or both of which may be used, serve as discharge openings for the control system. The passage 88, as shown in Figure 3, is plugged, but it is understood that it can be connected with a discharge pipe, or just left open if there is provision below the assembly for allowing water to run off.

Again it is to be noted that all of the bores, 58, 75, 80, 81, 83 and 86 are in the body of the head. Thus, when the head is removed, they are removed with it without being in any way altered, or disturbed by that removal. When the head is replaced they are automatically put back in their proper operating position and relationship. No exterior piping whatsoever need be removed in removing the head, or need be replaced in replacing it, for there is none engaged with the head. Discharge piping, if any, is engaged with the opening 88. That opening is in the body of the assembly.

The head 2 is suitably secured in place on the body by a number of stud bolts 90 provided with suitable nuts 91. These are so located as to provide proper and leak-proof securing of the head on the body. All that needs to be done to remove the head is to remove the nuts 91 and lift it off.

As indicated at 92 (Figures 1 and 5), the head 2 has openings at spaced positions about its upper surface into the bores 81. These, however, are suitably plugged by means of screw plugs shown at 93. In addition, the center portion of the head receives a cover plate 94 which overlies the chamber 60 and forms a top closure for the same. This cover plate is suitably secured by stud bolts 95 extending into the head and receiving nuts 96.

Figure 2:
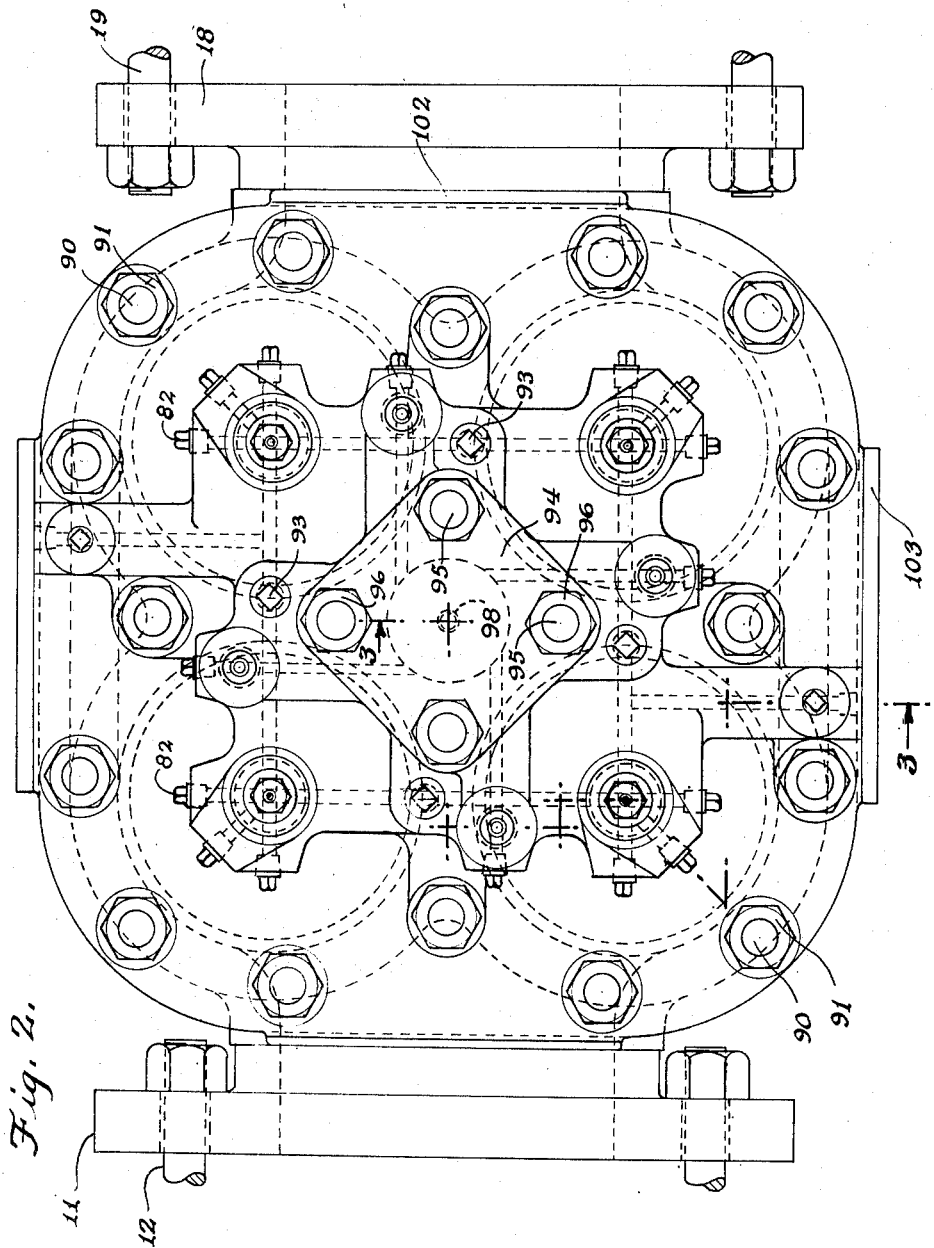
Figure 2 is a top plan view of a complete assembly with the protecting dome removed.

The center of the plate 94, as shown in Figures 1 and 2, threadedly receives one end of a long stud 97 at 98. A cap screw 99 is threaded on the other end of this stud to hold the protecting dome 100 in place. The dome 100 overlies the while of the head and protects the same and the working elements thereof against damage from objects which might fall down the elevator shaft. In particular, it protects the metering needle valve 67 and the solenoid operated needle valve 78, as well as the solenoid 101 against any such injury. Nevertheless, the dome 100 is readily removable. It seats on ledges 102 and 103 extending outwardly from the ends and sides of the head respectively, being flanged at 104 around its open mouth for that purpose. Replacement and removal of the dome merely requires the removal of the cap screw 99 whereupon the dome can be lifted on or off. Thereafter, either the stud 97 or the ledges 103 may be employed for lifting off the head, once the nuts 91 are removed.

In the event that the electric power for operating the solenoids 101 should fail, provision is made for operating one of the valves by hand, so that the elevator may be moved to desired position. This provision is by means of the spindle 105 threadedly received at 106 in a bushing 107 in the bottom 108 at the housing 1. A hand wheel 109 is provided for turning the spindle so that its upper end 110 can be engaged with the bolt head 29. Further turning after engagement will cause the valve to be raised thereby letting water flow tnrough the openings 33 for the operation of the elevator.

Provision is made in the bottom 108 for inserting such a spindle beneath any one of the four valves in the assembly. Normally, however, only one spindle will be employed in each assembly, so that the remaining apertures are plugged as shown at 111. In addition, the side wall of the housing 1, where it communicates with the chamber portion 4, may be provided with small bores 112 closed by suitable plugs 113.

To briefly relate the operation of this valve mechanism, it is first to be understood that an assembly of four valves is provided for each direction of movement of an elevator. Out of each four valves, three are employed progressively for controlling the normal movement of the elevator and the speed thereof, and the fourth is used alone for levelling purposes. The operation of the elevator being hydraulic and normally being by means of water under pressure from a suitable supply, the only electric power needed is such as is required to operate the simple solenoids 101.

When water from the supply enters the chamber portion 3 through the opening 7 with all the valves closed, it will find its way through the opening 61 into the well 59, through that into the upper chamber 60 and through the passages 65 and 57 down into the cylinder above the piston 41. At the same time, water will find its way through the passages 50 in the valve head, or past the sides of the skirts 35 as the case may be, into the smaller cylinder beneath the piston 41 in which the skirt 35 rides. Since part of the space in this lower cylinder will be taken up by the valve stem 30, the area of the underside of the piston 41 to be acted upon by the water will be substantially less than that on the upper side. Hence, the piston 41 will be held down by this force differential in addition to such aid as may be given by the action of the spring 45. The shields 27 will thus be kept down in the sleeves 20 and the packing rings 23 will seat on the seats 22. Thus, no water will flow in either the operating system, or the control system and the elevator will remain stationary.

To commence the operation of the elevator, one of the solenoids, such as the left hand one, 101, in Figure 1, will be energized, thus raising the needle valve 78 from its seat 79 and allowing the water to flow from the cylinder above the piston 41. This water will flow out through the passage 56, the bore 58, the short bore 75, down through the vertical bore 80 and out through the bores 81 and 83. The pressure on the upper side of the piston thus being relieved, the force exerted by the water acting on the underside of the piston 41 will be sufficient to force it up. Thus the valve head will be raised and the shield 27 will slide up in the sleeve 20 until water in the operating system can flow through the apertures 32 down into the discharge portion 4 of the lower chamber. This flow of water, acting on suitable hydraulic equipment will cause movement of the elevator. Should increased speed of operation be desired, another, and still a third, of the solenoids can be actuated to provide similar actuation of its accompanying control valve with increased flow of water in the operating system. To bring the elevator to a stop, the solenoids are de-energized thereby causing their needle valves, which are biased in closing direction, to close. This stops the flow of water in the control system whereupon the pressure above the piston 41 builds up to force it down. This results in a closing of the valves in the operating system and brings the elevator to a stop.

For moderate movement of the elevator to level it at a desired floor, the fourth of the valves in the assembly is employed. It is open and closed in just the same manner as are the other three valves. The apertures 33 in the shield may, however, be designed for smaller opening, or different rate of opening, from those of the other valves, as will be apparent from the requirements of a levelling action.

The fitting together and adjustment of the various elements of the assembly can obviously be done in a very simple and straightforward manner. Removal of the head 2 is all that is necessary to enable one to get at the pistons 41 which, when they are removed up through the cylinders 43, bring with them the valve head 25 and the shield 27. Thus, the packing ring 23 and the shield 27 can be readily replaced and removed by removal of the bolt 29. Speed adjustments can thus be easily made by substituting one or more shields having different sized apertures therethrough for those already present.

Further and greater simplification is present in the control system as against those of known hydraulic systems. Here, the head carries everything within it and removal of the head can be effected without the necessity of removing any piping, because the only fluid passages that exist from the head are between the well 59 in the body 1 and the chamber 60 and between the bores 86 and 87. Finally, adjustment of the pressure on the upper side of the piston 41 can be easily controlled by merely removing the screw cap 70 and turning the metering valve 67 as desired.

It will be apparent to one skilled in the art that changes may be made in the above described and illustrated valve assembly construction and different embodiments of the invention contained therein could be made without departing from the scope thereof. It is, accordingly, to be understood that all matter contained in the above description or shown in the accompanying drawing, shall be interpreted as illustrative and not in a limiting sense.

Having described my invention, what I claim as new and desire to secure by Letters Patent is:

1. In valve construction for controlling the operation of hydraulic elevators, a generally bowl shaped body portion having a closed bottom, the lower part of said body portion being formed with horizontally extending inlet and outlet passageways in spaced vertical relation and including openings extending out through the sides of said body portion, a horizontally extending web in said body portion extending across the same and separating said inlet and outlet passagesways, said web being formed with a plurality of openings therethrough, the upper portion of said body above said web being formed with a plurality of cylinders therein in axial alignment with said openings, said body having a centrally located vertically extending separating portion separating said cylinders and extending from the upper of said passageways to the upper surface of said body and said separating portion being formed with a vertically extending conduit therethrough, said conduit communicating at its lower end with the upper of said passageways and, at its upper end, opening out at the upper end of said head.

2. In valve construction for controlling the operation of hydraulic elevators, a generally bowl shaped body portion having a closed bottom, the lower part of said body portion being formed with horizontally extending inlet and outlet passageways in spaced vertical relation and including openings extending out through the sides of said body portion, a horizontally extending web in said body portion extending across the same and separating said inlet and outlet passages, said web being formed with a plurality of vertically extending openings therethrough providing communication between said passageways, said openings being symmetrically located about the vertical center of said body, the upper portion of said body above said web being formed with a plurality of cylinders therein in axial alignment with said openings, said body having a centrally located vertically extending separating portion separating said cylinders and extending from the upper of said passageways to the upper surface of said body and said separating portion being formed with a vertically extending conduit therethrough, said conduit communicating at its lower end with the upper of said passageways and, at its upper end, opening out at the upper end of said head.

3. In valve construction for controlling the operation of hydraulic elevators, a generally bowl shaped body formed with an open chamber in the lower portion thereof, a horizontally extending wall extending across said body within said chamber and separating said chamber into upper and lower passageways, the side wall of said body being formed with vertically spaced openings therethrough communicating with said passageways, the upper portion of said body above the upper of said passageways being formed with a plurality of symmetrically spaced vertically extending cylinders, said cylinders being separated by a vertically extending framework, said horizontally extending wall being formed with openings therethrough in alignment with said cylinders and said framework being formed with a vertically extending conduit therethrough communicating at its lower end with the upper of said passageways and opening at its upper end through the upper surface of said body.

4. In valve construction for controlling the operation of hydraulic elevators, a generally bowl shaped body formed with an open chamber in the lower portion thereof extending across said body, a horizontally extending wall extending across said body within said chamber and separating said chamber into upper and lower passageways, the side wall of said body being formed with vertically spaced openings therethrough, one communicating with each of said passageways, the upper portion of said body above the upper of said passageways being formed with a plurality of vertically extending cylinders symmetrically spaced with respect to the vertical center of said body, said cylinders being separated by a vertically extending framework, said horizontally extending wall being formed with openings therethrough in alignment with said cylinders and said framework, about the vertical center of said body, being formed with a vertically extending conduit therethrough communicating at its lower end with the upper of said passageways and opening at its upper end through the upper surface of said body.

5. In valve construction for controlling the operation of hydraulic elevators, a generally bowl shaped body portion having a closed bottom, the lower part of said body being formed with horizontally extending inlet and outlet passageways in spaced vertical relation, each extending substantially across said body, and including openings extending out through the sides of said body, a horizontally extending web in said body extending across the same and separating said inlet and outlet passageways, said web being formed with a plurality of vertically extending valve openings therethrough, valve members seated about said openings, the upper portion of said body above the upper of said passageways being formed with a plurality of vertically extending cylinders therein in axial alignment with said openings in said web, pistons in said cylinders and piston rods connecting said pistons with said valves for raising and lowering the same, said body having a centrally located vertically extending separating portion separating said cylinders and extending from said upper of said passageways to the upper surface of said body, said separating portion being formed with a vertically extending conduit therein extending throughout the height thereof.

6. In valve construction for controlling the operation of hydraulic elevators, a generally bowl shaped body portion having a closed bottom, the lower part of said body being formed with horizontally extending inlet and outlet passageways in spaced vertical relation, each extending substantially across said body, and including openings extending out through the sides of said body, a horizontally extending web in said body extending across the same and separating said inlet and outlet passageways, said web being formed with a plurality of vertically extending valve openings therethrough, valve members seated about said openings, said valve members including cylindrical portions extending within said openings, said cylindrical portions being formed with passages of varying area therethrough, the upper portion of said body above the upper of said passageways being formed with a plurality of vertically extending cylinders therein in axial alignment with said openings in said web, pistons in said cylinders means for introducing fluid into and discharging the same from said cylinders at both sides of said pistons to move the same, fluid flow control means carried on said body for controlling the flow of said fluid and piston rods connecting said pistons with said valves for raising and lowering the same to expose and conceal said variable area passages.

7. In valve construction for controlling the operation of hydraulic elevators, a generally bowl shaped body portion having a closed bottom, the lower part of said body being formed with horizontally extending inlet and outlet passageways in spaced vertical relation, each extending substantially across said body, and including openings extending out through the sides of said body, a horizontally extending web in said body extending across the same and separating said inlet and outlet passageways, said web being formed with a plurality of vertically extending valve openings therethrough, valve seats formed about said openings, valve members for closing said openings, each of said valve members including a portion engaging said valve seats and an annular sleeve extending into said opening in slidable relation with respect thereto, said sleeve being formed with passages of varying area therethrough, the upper portion of said body above the upper of said passageways being formed with a plurality of cylinders therein in axial alignment with said openings in said web, pistons in said cylinders means for introducing fluid into and discharging the same from said cylinders at both sides of said pistons to move the same, fluid flow control means carried on said body for controlling the flow of said fluid and piston rods connecting said pistons with said valves for raising and lowering the same to expose and conceal said variable area passages.

8. In valve construction for controlling the operation of hydraulic elevators, a generally bowl shaped body portion having a closed bottom, the lower part of said body being formed with horizontally extending inlet and outlet passageways in spaced vertical relation, each extending substantially across said body, and including openings extending out through the sides of said body, a horizontally extending web in said body extending across the same and separating said inlet and outlet passageways, said web being formed with a plurality of vertically extending valve openings therethrough, valve members seated about said openings, the upper portion of said body above the upper of said passageways being formed with a plurality of vertically extending cylinders therein in axial alignment with said openings in said web, pistons in said cylinders and piston rods connecting said pistons with said valves for raising and lowering the same, said body having a centrally located vertically extending separating portion separating said cylinders and extending from said upper of said passageways to the upper surface of said body, said separating portion being formed with a vertically extending conduit therein extending throughout the height thereof, a head secured in leakproof engagement across the upper end of said body and means formed in said head and communicating with said vertically extending conduit of said body for controlling the action of said pistons.

9. In valve construction for controlling the operation of hydraulic elevators, a generally bowl shaped body portion having a closed bottom, the lower part of said body being formed with horizontally extending inlet and outlet passageways in spaced vertical relation, each extending substantially across said body, and including openings extending out through the sides of said body, a horizontally extending web in said body extending across the same and separating said inlet and outlet passageways, said web being formed with a plurality of vertically extending valve openings therethrough, valve members seated about said openings, the upper portion of said body above the upper of said passageways being formed with a plurality of vertically extending cylinders therein in axial alignment with said openings in said web, pistons in said cylinders and piston rods connecting said pistons with said valves for raising and lowering the same, said body having a centrally located vertically extending separating portion separating said cylinders and extending from said upper of said passageways to the upper surface of said body, said separating portion being formed with a vertically extending conduit therein extending throughout the height thereof, a head secured in leakproof engagement across the upper end of said body, a well formed in said head and communicating with said vertically extending conduit of said body, horizontally extending control conduits formed in said head and communicating with said well and vertically extending control conduits extending between said horizontally extending control conduits and said cylinders above said pistons.

10. In valve construction for controlling the operation of hydraulic elevators, a generally bowl shaped body portion having a closed bottom, the lower part of said body being formed with horizontally extending inlet and outlet passageways in spaced vertical relation, each extending substantially across said body, and including openings extending out through the sides of said body, a horizontally extending web in said body extending across the same and separating said inlet and outlet passageways, said web being formed with a plurality of vertically extending valve openings therethrough, valve members seated about said openings, the upper portion of said body above the upper of said passageways being formed with a plurality of vertically extending cylinders therein in axial alignment with said openings in said web, pistons in said cylinders and piston rods connecting said pistons with said valves for raising and lowering the same, said body having a centrally located vertically extending separating portion separating said cylinders and extending from said upper of said passageways to the upper surface of said body, said separating portion being formed with a vertically extending conduit therein extending throughout the height thereof, a head secured in leakproof engagement across the upper end of said body, a well formed in said head and communicating with said vertically extending conduit of said body, a first set of horizontally extending control conduits formed in said head and communicating with said well and a first set of vertically extending control conduits extending between said first set of horizontally extending control conduits and said cylinders above said pistons and a second set of horizontally extending control conduits formed in said head into a closed figure and a second set of vertically extending control conduits extending between said closed figure and said cylinders above said pistons.

References Cited in the file of this patent

UNITED STATES PATENTS

| | | |
|---|---|---|
| 764,240 | Hinman | July 5, 1904 |
| 780,754 | Junggren | Jan. 24, 1905 |
| 1,757,059 | Rickenberg | May 6, 1930 |
| 1,827,574 | Frazier | Oct. 13, 1931 |
| 2,269,865 | Shaw | Jan. 13, 1942 |
| 2,291,101 | Papulski | July 28, 1942 |
| 2,373,654 | Beekley et al. | Apr. 17, 1945 |
| 2,398,775 | Beekley et al. | Apr. 23, 1946 |
| 2,404,087 | Parsons | July 16, 1946 |
| 2,569,014 | Martin | Sept. 25, 1951 |
| 2,595,311 | Strange | May 6, 1952 |
| 2,650,609 | Herbst | Sept. 1, 1953 |

FOREIGN PATENTS

| | | |
|---|---|---|
| 15,829 | Great Britain | of 1915 |
| 270,743 | Great Britain | Sept. 8, 1927 |